United States Patent [19]
Smirnov et al.

[11] Patent Number: 5,788,865
[45] Date of Patent: Aug. 4, 1998

[54] PROCESS FOR SEPARATING A HYDROPHOBIC LIQUID FROM A LIQUID CONTAMINATED THEREWITH

[75] Inventors: Aleksandr Vitalievich Smirnov; Oleg Georgievich Orlov; Pyotr Nikolaevich Golipad; Yurii Nikolaevich Koriakin; Leonid Tmofyeecvich Vyalchenkov, all of Moscow, Russian Federation

[73] Assignee: Herbert F. Boeckman, II, Sepulveda, Calif.

[21] Appl. No.: 416,743
[22] PCT Filed: Oct. 4, 1993
[86] PCT No.: PCT/US93/09404
§ 371 Date: May 22, 1996
§ 102(e) Date: May 22, 1996
[87] PCT Pub. No.: WO94/08902
PCT Pub. Date: Apr. 28, 1994

[30] Foreign Application Priority Data

Oct. 14, 1992 [RU] Russian Federation ............ 92000506

[51] Int. Cl.[6] .......................................... C02F 1/28
[52] U.S. Cl. .................. 210/690; 210/691; 210/922; 210/924; 210/925
[58] Field of Search ................................. 210/691, 693, 210/694, 925, 922, 923, 768, 770

[56] References Cited

U.S. PATENT DOCUMENTS 5,282,975  2/1994  Maryasin et al. ..................... 210/924

Primary Examiner—Neil McCarthy
Attorney, Agent, or Firm—Oppenheimer Poms Smith

[57] ABSTRACT

Disclosed herein is a process for separating a hydrophobic liquid from a substantially polar medium through the application of expanded graphite particles. Upon contacting the hydrophobic liquid floating agglomerates of expanded graphite and hydrophobic liquid are formed which may easily be removed from the polar liquid by mechanical means. Following the removal of the agglomerates from the polar medium, the hydrophobic liquid may be separated with little effort and recycled. Further, the adsorptive properties of the expanded graphite can be regenerated allowing the material to be used repeatedly. The present invention is particularly useful for removing liquid hydrocarbons from contaminated bodies of water.

15 Claims, 2 Drawing Sheets

PROCESS FOR SEPARATING A HYDROPHOBIC LIQUID FROM A LIQUID CONTAMINATED THEREWITH

FIELD OF THE INVENTION

This invention generally relates to a method for separating hydrophobic liquids from a substantially polar solution and is particularly applicable to removing liquid hydrocarbons from contaminated bodies of water.

BACKGROUND OF THE INVENTION

Over the years various approaches have been used to separate hydrophobic liquids from polar solutions. The resultant methodology has been applied to a number of fields ranging from pharmaceutical preparation to the removal of environmental contaminants. While these previously disclosed methods have proven useful for selected operations under controlled conditions, their applicability in more demanding situations is limited. In particular there exists a need for an efficient and economical process to remove hydrophobic liquids such as oil or petroleum products from bodies of water. Moreover these methods should permit the cost effective recycling of at least a portion of the recovered hydrophobic contaminant.

A steady demand for petroleum products among the industrialized nations has ensured a high volume of oil transfer with a corresponding release of material into the environment. The detrimental economic and ecological impact associated with such releases have generated several techniques for limiting the spread of the oil as well as minimizing the attendant damage. However such techniques are often labor intensive, expensive and provide less than optimal results. These problems increase exponentially when the volume of oil spilled is substantial as is the case with many tanker accidents. Further, current methods are often so inefficient that the natural actions of wind and waves disperse the oil before it can be removed. Accordingly, substantial amounts of hydrocarbons are introduced into the ecosystem despite careful monitoring and timely responses to inadvertent discharges.

As recent events illustrate, the contamination of natural bodies of water by petroleum products can cause extensive environmental damage and threaten wildlife over wide regions. Delicate wilderness areas are subject to exposure to oil and oil byproducts through spills and leaks from accidents, warfare, and dumping, as well as leakage from oil drilling operations. Illegal dumping of unwanted petroleum based products is a common problem in both natural bodies of water and manmade receptacles. Regardless of how the contaminating agent is introduced, economic damage may result through the destruction of aquatic life, compromised water supplies, fouled beaches, and damaged port facilities. More importantly, if left untreated or subjected to improper or inefficient removal techniques, such contamination can adversely impact the development of the effected ecosystem for many years.

Despite the concerted efforts of environmentalists, government officials and industry, current measures for oil spill abatement are generally ineffective in uncontrolled situations. While several strategies have been developed, technical and physical problems associated with the separation and removal of hydrophobic liquids from bodies of water have thus far proved intractable. Currently the most environmentally sound methods used to counter oil spills involve the containment and physical removal of the contaminant. However such techniques are often prohibitively expensive and ineffective in the face of adverse conditions. Other measures involve the physical disruption of the petroleum based product and its natural dissipation in the environment. Such methods include burning, chemical dispersion or the sinking of the oil. While these measures may be more cost efficient than physical removal of the oil, they are often far more disruptive to the environment. In addition to the continuing presence of petroleum in some form, the implementation of these dissipative clean up procedures often results in the generation of toxic byproducts.

For instance, detergents are often used as a rapid and cost efficient way to disperse hydrophobic liquids in an aqueous environment. Yet the detergents employed for such tasks often contain large amounts of phosphorus and are highly toxic to any aquatic life in the area. This is especially true when the contaminated body of water is a relatively closed system such as a lake or stream. Moreover, the dispersion of the petroleum based products may result in increased toxicity over a far greater range than a relatively coherent slick. In fact, the formation of detergent-hydrocarbon complexes may actually facilitate the entry of the oil into the ecosystem and concentrate it in the flora and fauna of the stressed area.

Similarly, the burning or sinking of the hydrocarbon contaminant can also increase the toxic impact of the material on living organisms. Besides being difficult to start in an aquatic environment, burning leaves behind large amounts of unreacted residue. In addition, the uncontrolled combustion of the petroleum products is likely to result in substantial amounts of air pollution. Conversely, sinking the oil may result in its extended preservation. To sink the oil, a nucleating agent is introduced which produces tar like agglomerations of hydrocarbons that settle to the sea floor. Often the sea floor environment is poor in oxygen which retards the further degradation of the agglomerated hydrocarbon. If the oil sinks to a shallow, well oxygenated sea floor, fragile ecosystems such as reefs or kelp beds are likely to be irreparably damaged. It is also important to note that the dispersal of the contaminating oil through burning or sinking effectively precludes any recycling efforts which may be used to offset clean up costs.

In view of the shortcomings inherent in such dissipative measures, the containment and physical removal of the contaminating hydrocarbon is the most desirable course of action from an ecological standpoint. Current practices involve the use of floating barricades to contain the oil and facilitate skimming or pumping operations. In addition to being labor intensive such techniques have proven largely ineffective and are expensive to implement on a large scale or in remote areas.

Existing technologies require that any containment efforts be initiated immediately and under favorable weather conditions to provide any chance for the removal of the oil. The slightest wave action or mild current can greatly increase the rate of hydrocarbon dispersion and render containment procedures futile. Even with appropriate response times, such efforts are often in vain allowing the slick to emulsify and dissipate within the ecosystem. Further, the time needed to take up and treat such large volumes of water allows the hydrocarbon to adversely affect the environment even if the bulk of the contaminant is eventually removed.

Another fundamental shortcoming in containment and skimming technologies is the inescapable requirement that enormous amounts of liquid must be physically transferred and processed. In any such operation a large proportion of the total material manipulated is the inert aqueous medium. Following the separation of the majority of the hydrophobic material the remaining water is usually subjected to further treatment before returning it to the environment. These treatments are generally performed in a relatively controlled environment such as storage tanks or on board ships, barges, or in tenders. Thus, large volumes of oil contaminated water must be physically handled and chemically treated in enclosed vessels. Such processing greatly inflates the cost of separating and removing a hydrophobic contaminant from the environment.

In order to avoid the costly and often intractable problems associated with separating liquids from liquids, absorbents have often been used to facilitate the removal of hydrocarbons from aqueous solutions. These materials are dispersed on the slick and absorb the oil, thereby forming agglomerates of material which may sink or float depending on the absorbent used. Floating agglomerates allow the absorbent and associated hydrocarbon to be physically collected without picking up large volumes of water. Accordingly, effective absorbents should primarily absorb the contaminating hydrocarbon and not the water. In other words the best materials for these applications are both oleophilic and hydrophobic. Among the absorbent materials which have been proposed for removing oil from water are wood chips, sawdust, certain clays, sulphur compounds, polymeric substances, cellulosic materials and many others. Currently most of the absorbents used for such tasks are not salvageable or reusable and are intended to be destroyed or discarded along with the sorbed oil. Significantly one of the major drawbacks to the use of these materials is the prohibitive cost inherent in the preparation and utilization of a non-recyclable sorbent.

In addition to these economic constraints, the use of non-recyclable absorbents are often limited by the properties of the material. For example certain absorbent materials have been reported to generate a charge when contacted with liquid hydrophobic compounds. The presence of these charged materials in the proximity of the combustible gases given off by volatile components of a spill can easily lead to catastrophic explosions. Further many absorbents are ineffective in extreme environmental conditions where the absorption rate and capacity of the material may be severely limited. Still other problems are brought about by the alteration of the absorbent under adverse conditions. Many materials possess limited hydrophobic characteristics or rapidly lose them when exposed to environmental conditions and preferably absorb water rather than the contaminating hydrocarbon. Even when the hydrocarbon is initially absorbed by the selected material, electrostatic interactions and environmental equilibration often allow the compounds to separate before the agglomerates can be collected and treated.

In an effort to circumvent some of the difficulties inherent in the use of absorbent materials, hydrophobic adsorbent materials have been applied to bodies of water contaminated with hydrocarbons. Hydrophobic adsorbent materials differ from absorbent materials in that they distribute any associated liquid hydrocarbons in a film over the surface of the adsorbing particle. In contrast, absorption involves the uptake of the liquid hydrocarbon into the body of the solid absorbent and is closely related to the porous structure of the absorbent material.

Commonly used adsorbent materials include plastic fibers, fine sands, clays, solid inorganic compounds, hydrophobic polymers and treated natural fibers. For example, peat fibers, coconut husk, cotton fibers, jute, or wool may be coated with hydrophobic materials such as rubber or paraffin to provide a floating adsorbent. However such coated fiber adsorbents generally involve labor intensive fabrication techniques and relatively sophisticated production facilities. Further such adsorbents are usually non-recyclable, often making them prohibitively expensive to employ. Similarly, other adsorbents such as hydrophobic polymers or plastic fibers may be too expensive for routine utilization and, if not easily biodegradable, may actually increase the adverse environmental impact. Other adsorbents such as inorganic materials, fine clay or sand often cause the floating oil to sink thereby rendering it unrecoverable. In addition most adsorbents suffer many of the same limitations as absorbents used for hydrocarbon removal. Among these limitations are ineffective hydrophobicity, limited retention times and lower efficiency under environmentally extreme conditions.

In addition to those materials previously mentioned, it has been suggested that activated carbon may provide an efficient adsorbent of liquid hydrocarbons in an aqueous environment. Activated carbon is the collective name for a group of porous carbons which usually contain small amounts of chemically bonded hydrogen and oxygen. In general they are manufactured either by the treatment of carbon with gases or by carbonization of carbonaceous materials with simultaneous activation by chemical treatment. The resultant carbon is usually in the form of small crystallites having dimensions considerably smaller than those observed in natural graphite. Adsorption properties of such carbon materials are generally related to the amount of inner surface area.

More specifically, U.S. Pat. No. 3,891,574 discloses a sphere of carbon which consists of a porous shell enclosing an empty space. The activated carbon particle is obtained by coating a core material with the carbon and subsequently removing the core through thermal decomposition. This process reportedly forms a heliosphere having a bulk density of approximately 275 g/l which has activated surfaces on both the interior and exterior surface. Among other uses, the disclosure teaches that the resultant material may be used to adsorb crude oil. Yet, in addition to being fairly heavy, the material has a relatively low loading capacity of approximately 1.5 times its weight after extended exposure to the oil. Further, the reported manufacturing process and separate activation of the particles appears to be quite labor intensive and comparatively expensive when contrasted with other existing adsorbents.

Accordingly, it is an object of the present invention to provide a method for separating hydrophobic liquids from polar liquid bodies through the use of a reusable, relatively low cost, adsorbent.

It is an additional object of the present invention to provide a cost efficient method for removing contaminating hydrocarbons from an aqueous body.

It is yet an additional object of the present invention to provide a method for regenerating a relatively low cost adsorbent following its use in separating a hydrophobic liquid from a polar liquid body.

It is a further object of the present invention to provide a method for recovering hydrophobic liquids from a polar solution.

SUMMARY OF THE INVENTION

These and other objects are achieved by the process of the present invention which provides a method by which hydrophobic liquids may be separated and removed from polar solutions. In particular, the present invention is successful in overcoming the problems associated with the prior art methods for removing petroleum based products from aqueous solutions. While the disclosed process is useful for all such separations, it may advantageously be used to clean up and remove spills of liquid hydrocarbons such as oil from natural bodies of water in an ecologically sound and cost efficient manner. The materials used in the process may be recycled repeatedly thereby reducing the costs and the amount of material necessary for the effective separation of the contaminating liquid. Moreover, the hydrophobic liquid recovered using this method may be processed and employed as originally intended thus eliminating waste disposal problems.

More specifically the present invention is directed to a process for removing a hydrophobic liquid from a liquid contaminated therewith, comprising:

contacting a liquid contaminated with a hydrophobic liquid with a plurality of expanded graphite particles;

forming an agglomerate resulting from adsorption of said hydrophobic liquid by said plurality of expanded graphite particles; and removing said agglomerate from the contaminated liquid.

In selected embodiments the process further comprises recovering the hydrophobic liquid and the expanded graphite particles from the agglomerates following their removal from the contaminated liquid. The present invention advantageously allows the recovery and eventual reuse of the hydrophobic liquid as well as the expanded graphite particles. This separation may be accomplished in a number of ways including the application of physical forces and the use of chemical agents. For instance, it is possible to remove the hydrophobic liquid from the agglomerates through the use of centrifugal force or mechanical pressing. Chemically, the use of selected surfactants will disrupt the adsorption forces between the hydrophobic liquid and the expanded graphite particles. Whichever method is chosen, the recovered hydrophobic liquid may be treated to remove any harmful impurities and used in its normal capacity.

Following the removal of the hydrophobic liquid, the expanded graphite particles can be reactivated through exposure to elevated temperatures. This application of heat, whether by direct combustion or other means, removes any residue of the hydrophobic liquid and regenerates the binding ability of the expanded graphite particles. It is important to note that the hydrophobic liquid does not have to be separated from the expanded graphite prior to its reactivation by heat. Regardless of whether the contaminating liquid is recovered for later use, the expanded graphite may be reactivated and reused.

While the present invention is very useful in the separation and removal of liquid hydrocarbons such as oil from aqueous solutions, it is applicable to the separation of any hydrophobic liquid from a substantially polar solvent. Examples of hydrophobic liquids which may be separated from polar solvents using the present invention include, but are not limited to, gasoline, kerosene, fuel oil, crude oil, paraffinic oils, xylenes, toluene, styrene, alkylbenzenes, naphthas, liquid organic polymers, vegetable oils and the like.

Similarly, though the present invention is particularly useful for removing hydrophobic liquids from natural bodies of water, the process may be practiced on any volume of fluid in any configuration. For example the fluid containing the hydrophobic liquid may be found in, but is not limited to, an area of ocean, bay, river, lake, a fluid ditch, holding tank, separation column, oil tanker compartment, oil transportation compartment, process stream, aquifer, or reservoir. Further, the composition of the fluid separated from which the hydrophobic liquid is to be separated is irrelevant provided that it is substantially polar in nature. Exemplary fluids include fresh water as well as aqueous solutions such as brine or sea water.

The expanded graphite particles used as the sorbent in the instant invention are highly porous in nature with a large amount of surface area per unit weight. These materials are well known and used in the manufacture of highly conductive ductile items, thermal insulation tape, compounds with a high specific surface, catalysts, packing, electrothermal elements, fillers and protective coverings. Expanded graphite particles are generally derived from oxidized forms of graphite through intercalation and thermal impact. During the production process, expanded graphite particles with various fill densities are derived depending on the degree of oxidation, the intercoolant used, and the physical parameters employed during the graphite expansion. Typically the unexpanded graphite particles are placed into an acid solution containing a strong oxidizing agent such as potassium dichromate, nitric acid or ammonium persulfate ($K_2Cr_2O_7$, $HNO_3$, $(NH_4)_2S_2O_8$). Following oxidation the particles are exposed to temperatures of approximately 1000° C. or more causing them to expand several orders of magnitude in volume. In addition to being extremely lightweight, generally on the order of 0.2 g/l–2 g/l, the resultant particles are hydrophobic in nature.

In general the amount of expanded graphite applied to the contaminated area is between 0.1% and 10% of the weight of the hydrophobic liquid. The amount of particulate matter distributed depends on the exact bulk density of the expanded graphite, but is preferably on the order of 0.5% to 5% of the weight of the hydrophobic liquid. Further while the expanded graphite particles are preferably in a dry, finely divided state which may be easily dispersed, they may be combined with a suitable non-reactive liquid carrier. Similarly, the method used to apply the expanded graphite particles is not critical and may be accomplished using techniques well known in the art. For instance the dispersal of the expanded graphite in the contaminated area may be achieved simply by casting the particulate matter on the contaminated surface. For larger areas the expanded graphite may be applied from a ship or aircraft, such as by using pressure guns; fans or spraying apparatus. Any method resulting in the substantial dispersion of the expanded graphite particles within the vicinity of the hydrophobic liquid can be used in the present invention.

When the expanded graphite particles are brought into contact with hydrophobic liquids such as oil floating on the surface of water they rapidly form cohesive, buoyant agglomerates. These semi-solid agglomerates generally have average dimensions on the order of 8 mm or larger and are sturdy enough to be collected using mechanical processes. That is, the mechanical strength of the cohesive agglomerates is such that they are generally not disrupted when subjected to mechanical collecting operations. By way of example mechanical collecting means include, but are not limited to, paddle collectors, water porous conveyor belts, screens, raking devices, floating fences and nets having mesh sizes less than the average diameter of the agglomerates being collected. Any means capable of separating the solid agglomerate from the polar liquid body is suitable for use in the present invention. At the same time it is important to note that the means used to collect the formed agglomerates may depend on their average size as well as other factors such as weather conditions or the condition of the body of water.

The present invention will now be described by means of an exemplary embodiment thereof taken in conjunction with the appended drawing figures.

DETAILED DESCRIPTION OF AN EXEMPLARY EMBODIMENT

Figure 1:
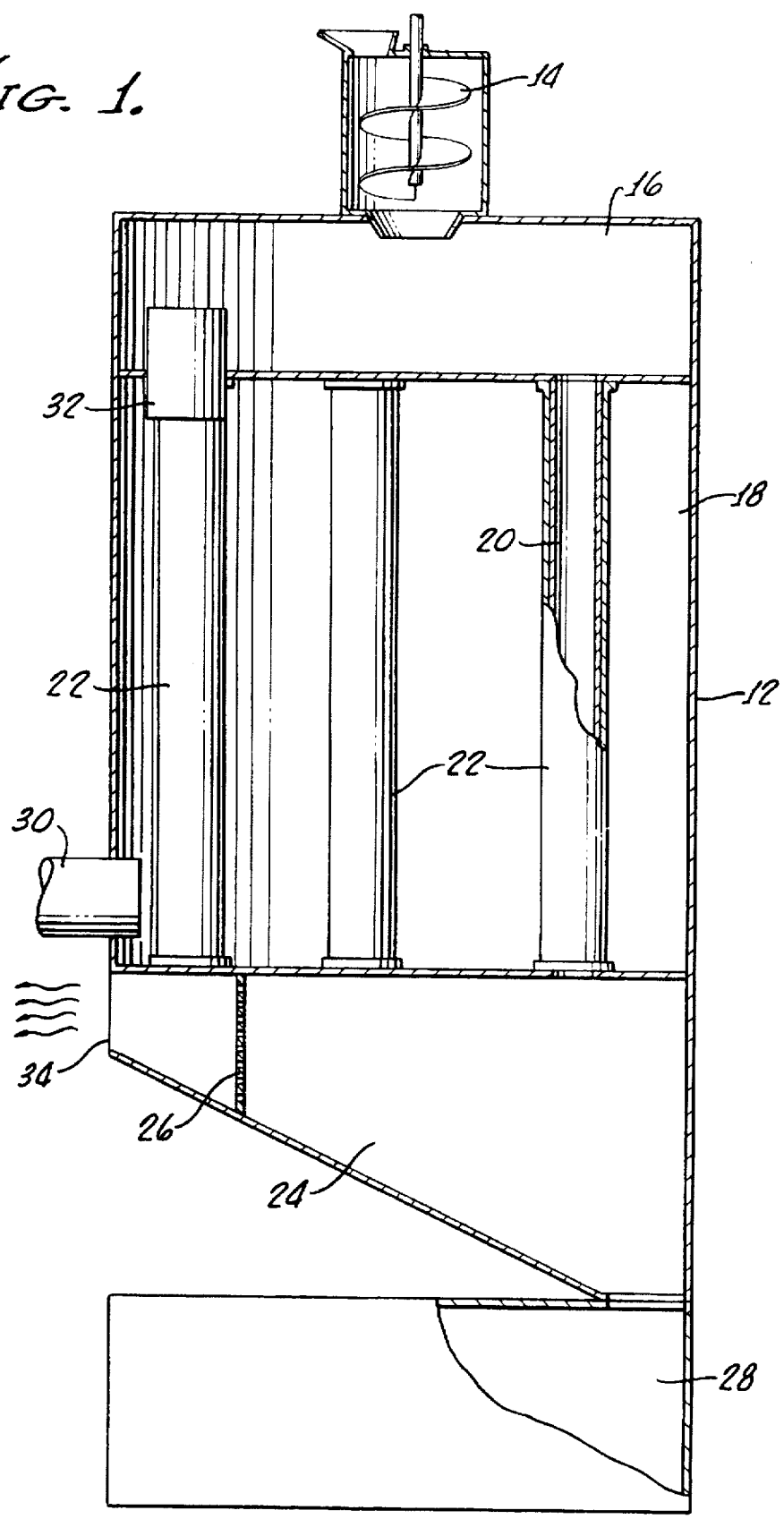
FIG. 1 is a longitudinal sectional view of a multichamber furnace used to expand the substantially dried intercalated graphite particles.

The process of the present invention is applicable to the removal of any hydrophobic liquid from a substantially polar environment. Use of expanded graphite particles in the disclosed process advantageously allows the recovery and subsequent treatment of the separated hydrophobic liquid as well as the regeneration of the graphite adsorbent. Accordingly, the present invention is highly suitable for separation or purification applications in manufacturing or laboratory settings. Yet, based on the lack of equivalent alternatives, one of the most significant applications of the present invention is the removal of contaminating hydrocarbons from bodies of water. Consequently, while the following exemplary embodiments are discussed within such a framework, this should in no way limit the applications of the present invention.

A process has been discovered for effectively and inexpensively separating hydrophobic liquids from a substantially polar medium. Essentially the process includes dispersing expanded graphite particles in the vicinity of a hydrophobic liquid; allowing the graphite particles to contact the hydrophobic liquid, thereby forming cohesive buoyant agglomerates; and physically collecting and removing the agglomerates from the polar medium. Significantly, by allowing for the recovery and further treatment of the hydrophobic liquid separation, costs are dramatically lowered. Similarly, the ability to easily and inexpensively regenerate the adsorption capacity of the expanded graphite particles allows their reuse, further lowering material costs.

Without the unique physical characteristics of expanded graphite particles, the numerous advantages of the present invention would be impossible to obtain. Other materials fail to combine the low bulk density of the expanded graphite with its high adsorption capacity and cost efficient fabrication from readily available materials. Due to the previous use of expanded graphite in other applications, several inexpensive fabrication methods have been developed to produce material which may be employed effectively in the present invention. Most of these fabrication processes depend on the use of inexpensive intercalated graphite as a starting material.

In general, intercalation compounds are formed by inserting extra atoms or molecules into a host structure, without disrupting the chemical bonds of the host material. Carbon atoms in graphite are located at the points of a hexagonal lattice and kept in place through relatively strong covalent bonds. In contrast the hexagonal lattices are displaced relative to each other and held in place by weaker Van Der Waals forces. The lower bond energy between the lattices and packing defects make the graphite particles susceptible to the insertion of foreign materials. For the production of graphite intercalation compounds, graphite powder is heat treated in the presence of a gaseous or liquid agent. The pressure at which actual intercalation begins is dependent on the polarity and the structural disorder of the graphite. Expansion to well over 100 times their original particle size may be realized.

The fabrication of the expanded graphite particles used in the present invention involves the thermal shock of previously formed intercalated graphite compounds. The process of oxidizing and expanding graphite has been previously described in the literature. Preferably the production of the desired intercalated graphite starts with highly ordered graphite flakes which having stack heights of at least 75 nm. Precursor flakes are usually treated with an oxidizing agent, such as mixtures of sulfuric acid and nitric acid to yield an intercalation compound. Other oxidizing agents such as $K_2Cr_2O_7$, $Kmno_4$, or $(NH_4)_2S_2O_8$ may also be used. The volume of the oxidizing solution used is not critical as long as it is sufficient to suspend the particulate mass and ensure effective intercalation. Large industrial processing may require relatively greater volumes or extended mixing times. While not necessary, the temperature may be elevated between 50° C. and 100° C. to increase the rate of oxidation. After the desired intercalated graphite is formed, the particles are thoroughly rinsed in water and then rapidly heated to approximately 1000° C. This heating, which results in further expansion, is generally performed in an electrical furnace allowing substantial amounts of expanded particles to be produced.

The degree of expansion is significantly influenced by the temperature of the heat transfer medium and the concentration of the intercalants added to the sulfuric acid. When ammonium persulfate is added to the sulfuric acid the degree of expansion drops in comparison to the use of potassium dichromate. Accordingly, oxidizing mixtures of sulfuric acid and potassium dichromate are preferred for large scale fabrication of expanded graphite because of the explosive character of mixtures of graphite with $H_2SO_4$ and $HNO_3$.

Depending on the fabrication process employed, the bulk densities of the expanded graphite may vary. Such properties are important in that they correspond to the adsorption capacity of the expanded graphite. More specifically the lower the bulk density, the higher the specific surface area will be, and, therefore, the higher the adsorption capacity for petroleum products. Moreover, at very low bulk densities of about 0.3–0.5 g/l the critical wettability angle may reach 180 degrees, which is manifested as an enhancement of the hydrophobic properties of the material. Like other graphite compounds these expanded graphite particles are resistant to temperature, aging, and most corrosive media in addition to possessing a relatively low coefficient of friction of about 0.08–0.1.

The following exemplary process may be used to produce expanded graphite particles suitable for use in the present invention.

EXAMPLE I

The starting material used for the production of these particles was large-flake graphite obtained from the Zaval'evskiy deposit located in Russia. After crushing, grinding and flotation beneficiation, a concentrate was obtained containing up to 10% gangue. From this precursor material various grades of graphite were produced differing only in their concentration of gangue. These include crucible graphite, pencil graphite, battery graphite, cast graphite, and scrap graphite. Tests have demonstrated that all graphites are oxidized identically and the surface of the expanded product changes little with the different graphite varieties.

Following the preparation of a suitable graphite sample, a charge of 10 to 20 grams of the material was treated with concentrated sulfuric acid mixed with approximately 2% potassium dichromate for one hour. During the oxidation process the flakes were separated and crushed. The suspension was then diluted with water, before the graphite was filtered to remove the excess oxidizer and dried on a ceramic filter to a moisture content of 40–50%. The amount of sulfuric acid remaining in the graphite was monitored by observing the pH of the wash water. When the wash was neutral the graphite was collected and partially dried. The bulk density of the raw material was 400–520 g/l, that of the wet, treated graphite was 1070–1200 g/l. This procedure was repeated using several different grades of graphite.

Following the production of these intercalated compounds they were expanded. First a quartz tube 68 or 76 mm in diameter was placed vertically in an electric furnace. The graphite was loaded into the top of the tube in the form of pellets 18 mm in diameter to a mass 5 g. Air was blown in from the bottom at 4–6 m³/hr at a temperature of 800° C. The pellets were dried and broken down into flakes which were carried out of the reaction tube by the air flow as they expanded. The expanded material was deposited in a calibrated glass cylinder while the heated air with the water vapor and sulfuric acid vapor was discharged into the atmosphere. The length of time spent by individual flakes in the furnace did not exceed 2.5 minutes. The as the heating rate was maintained between 2°–25° C./sec. For all intercalated specimens which had a pH range of 1–7 before heating the process of expansion yielded expanded flakes with bulk density 1.4–2.0 g/l. Visual observation under a microscope of the behavior of individual flakes showed that they were converted to floccules exhibiting tube like structures. The conversion of the flakes to tubes and the formation of floccules increased the porosity of the layer and correspondingly, decreased the bulk density.

Properties of these expanded graphite particles formed from different grades of graphite are shown in Table I.

TABLE I

| GRADE OF GRAPHITE | ASH CONTENT | FLAKE THICKNESS, mm | BULK DENSITY, g/l | | EXPANDED GRAPHITE SURFACE m²/g |
|---|---|---|---|---|---|
| | | | INITIAL | EXPANDED | |
| Scrap | 0.1% | 0.015–0.020 | 405 | 1.4–1.5 | 46.5 |
| Battery | 1.0% | 0.015–0.020 | 470 | 1.7–1.9 | 47.7 |
| Crucible | 7.0% | 0.015–0.020 | 520 | 2.0 | 43.2 |
| Pencil | 9.0% | 0.015–0.020 | 490 | 1.8–1.9 | 45.4 |

It follows from the characteristics illustrated in Table I that the bulk density and the surface properties of the expanded product change little for various grades of graphite. The expanded graphite obtained from crucible type graphite with an ash content of approximately 7% contained particles of measuring 0.2–1.0 mm and floccules measuring approximately 30–40 mm. Similarly, the expanded material fabricated from scrap graphite had particles and floccules exhibiting roughly the same proportions. The degree of expansion, estimated based on the bulk density, reaches 270–290, which is explained not only by the expansion of the particles themselves, but also by the increasing porosity of the outer layer. Microscopic examination of the samples show that the surface of the tubes feature projections indicative of the convoluted macrostructure of the expanded graphite.

In order to further illustrate the production of expanded graphite particles which are suitable for use in separating hydrophobic liquids the following fabrication was preformed using industrial facilities. This exemplary process also demonstrates the applicability of the fabrication methodology to large scale industrial configurations in a cost efficient manner. Specifically, Example II and the data shown in Table II indicate the impact of process parameters on the production of highly adsorptive graphite particles particularly useful in the present invention.

EXAMPLE II

Intercalated material was produced using battery graphite in the procedure outlined in the Example I. Following neutralization of the intercalated graphite, the partially dried particles were expanded as follows:

Referring to FIG. 1, the expansion of the intercalated graphite takes place in a multichamber furnace 12. Initially cold gas (air, nitrogen) is fed through an entry port 30 into the bottom of a cylindrical chamber 18 where it is heated to a temperature of 600°–800° C. The heated gas is then injected tangentially through a pipe 32 into a mixing chamber 16 having a protective casing and located at one end of the cylindrical chamber 18. Partially dried, oxidized graphite is simultaneously fed by a screw motor 14 into the mixing chamber 16 at rates determined by the size of the apparatus. The hot gas medium is mixed with the oxidized graphite in the mixing chamber 16 and the resulting downward flow is directed into a tube-like cavity of one or more silicon carbide heaters 20. The heaters 20 (or heater) are insulated on their exterior 22 and run through the length of the cylindrical chamber 18. Within the heater cavity the gaseous suspension of intercalated graphite was rapidly heated to between 1350° C. and 1500° C. undergoing partial expansion. The mixture of hot gases and partially expanded graphite particles were then fed into a rarefaction chamber 24 adjacent to the cylindrical chamber 18 at the end opposite the mixing chamber 16. Here the graphite expands further due to the substantial pressure differential created by the 10–20 fold expansion of gas into the volume of the rarefaction chamber 24. The gaseous products were then removed through a lattice 26 and outlet port 34 while the expanded graphite is injected into a storage vessel 28.

Expanded graphite with different bulk densities was obtained depending on the operating mode and the structural features of the unit. In particular, varying the pressure change due to the ratio of the inner diameter of the rarefaction chamber to the inner diameter of the heating cavity had a dramatic effect on the bulk density of the finished expanded graphite. As previously indicated the preferred bulk densities for adsorbing hydrophobic liquids range from approximately 0.3 g/l to 2.0 g/l. Accordingly, Example II demonstrates that these processing parameters can be adjusted to consistently produce expanded graphite having bulk densities particularly suitable for use in the present invention. The results of varying these parameters are shown in Table II.

TABLE II

| EXPERIMENT NUMBER | EXPANSION TEMPERATURE OF OXIDIZED GRAPHITE, °C. | UNIT PRODUCTIVITY KG/HR | NUMBER OF HEATERS | RATIO OF INNER DIAMETERS OF RAREFACTION AND HEATING CHAMBERS | BULK DENSITY g/l | COST OF ELECTRIC POWER, KW/KG GRAPHITE |
|---|---|---|---|---|---|---|
| 1 | 1350 | 1.5 | 1 | 1:1 | 6.0 | 1.0 |
| 2 | 1350 | 1.5 | 1 | 5:1 | 1.0 | 1.0 |
| 3 | 1350 | 1.5 | 1 | 10:1 | 0.5 | 1.0 |
| 4 | 1350 | 1.5 | 1 | 15:1 | 0.4 | 1.0 |
| 5 | 1350 | 2.0 | 1 | 20:1 | 0.3 | 1.0 |
| 6 | 1350 | 2.5 | 1 | 25:1 | 0.35 | 1.0 |
| 7 | 1350 | 2.5 | 1 | 30:1 | 0.35 | 0.7 |
| 8 | 1350 | 6.0 | 4 | 20:1 | 0.35 | 0.6 |

Figure 2:
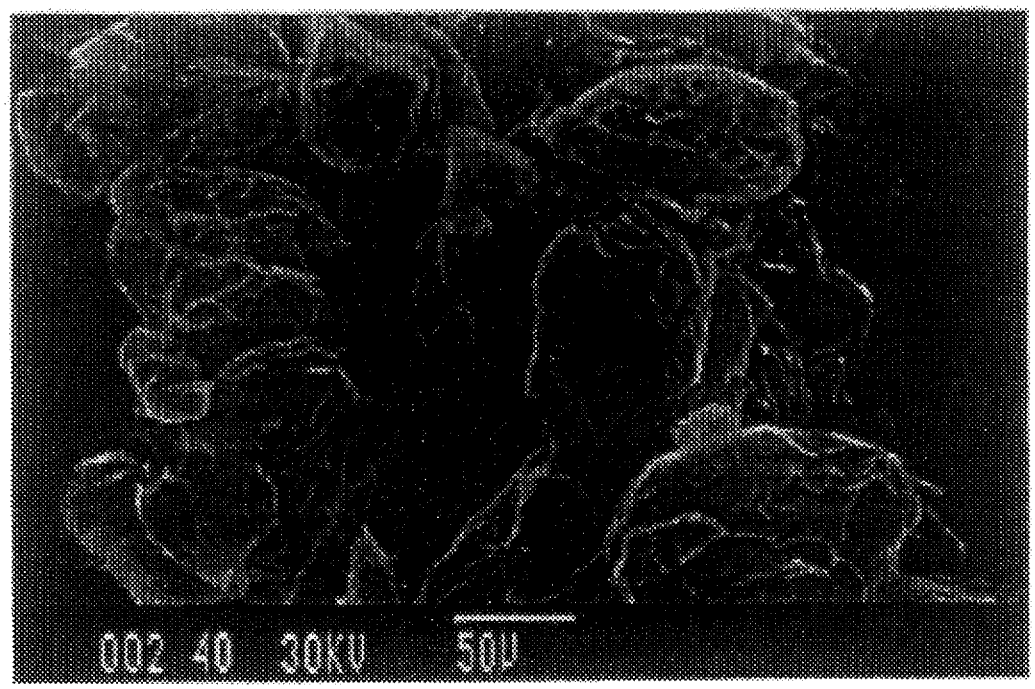
FIG. 2 is a photograph of unexpanded intercalated graphite particles magnified 1000× having a 50 µm scale bar at the bottom center.
Figure 3:
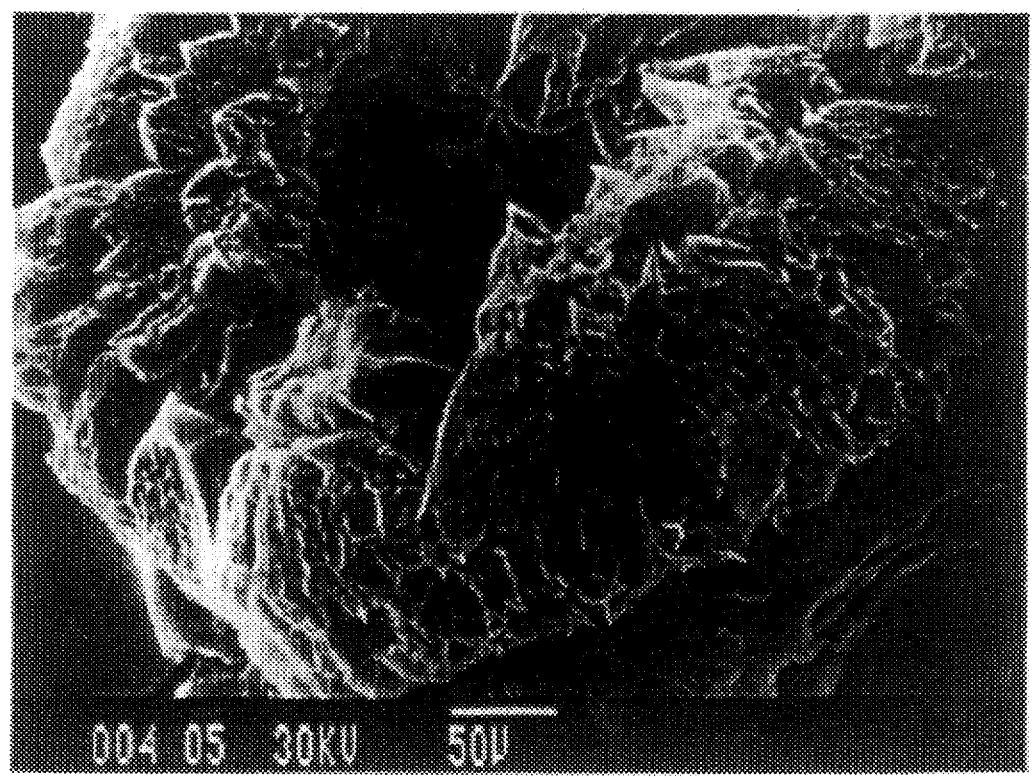
FIG. 3 is a photograph of expanded graphite particles magnified 1000× having a 50 µm scale bar at the bottom center.

As with the expanded graphite particles produced in Example I, FIGS. 2 and 3 show that process described in Example II transformed intercalated graphite flakes into expanded graphite exhibiting a highly porous structure. Cursory observation shows the increased surface area and convoluted exterior of the expanded material in FIG. 3 contrast sharply with the smooth regular surface of the unexpanded graphite of FIG. 2. More specifically, FIG. 3 shows a sample of expanded graphite particles obtained using the procedure described in Example II while FIG. 2 shows the same sample prior to expansion. Both images have been magnified 1000× and scale bars are provided to give some idea of the size of the individual flakes.

In addition to relatively efficient fabrication techniques, large scale production of expanded graphite is facilitated by the favorable storage properties of the material. Generally speaking, the adsorptive capacity of the expanded graphite is undiminished by the passage of time. Little or no adsorptive degradation occurs until the particulate matter is brought into contact with substantially hydrophobic material. For the purposes of the present invention the expanded graphite may be stored in a dried state or formulated with a non-reactive carrier liquid. To a large extent the storage and post production handling of the expanded graphite is dependant on the ultimate use of the material. For instance in large shipboard operations it may be more convenient to handle the carbon as a liquified slurry or suspension. Conversely, for small, immediate applications of the expanded particles it may be more convenient to directly apply substantially dry powdered material by hand.

In either case, the method of application is not critical for the separation of the hydrophobic liquid from the polar medium and may be done in any convenient manner. The dispersement of the expanded graphite particles may be accomplished from land, the deck of a ship or from the air depending on the size and nature of the separation desired. For example, a large oil slick may be contained most efficiently by dispersing the expanded graphite over an extensive area from the air. The lightweight particulates may be dropped directly from the aircraft or mixed with a liquid carrier and applied using cropdusting techniques. Other mechanical distribution means such as commercially available spray guns or spreaders may also be used. For smaller bodies of water such as holding tanks or drainage ditches which are easily accessible and have a well defined area the application of the expanded graphite may be readily accomplished without mechanical assistance.

The following example demonstrates the effectiveness of the expanded graphite particles when used to separate a hydrophobic liquid from a polar medium.

EXAMPLE III

Expanded graphite particles were dispersed on the surface of a body of water heavily contaminated with a liquid hydrocarbon. After a short period the expanded particles were collected and removed from the surface of the liquid bearing almost all of the contaminant. The loaded particles were then combusted to remove the adsorbed hydrocarbon and regenerate the adsorption capacity of the expanded graphite particles. Following this regeneration the expanded graphite was then applied to a contaminated liquid surface comparable to the first mixture. The entire process was repeated through a total of ten cycles with little or no loss of particulate adsorption capacity.

A wide variety of organic hydrophobic liquids were combined with water and subjected to the experimental conditions detailed below. Among the contaminating substances removed from an aqueous medium were black oil, machine oil, coke distillate, kerosene, acetone, toluene, and naphthalene. The protocol and data reproduced below are for an exemplary embodiment of the invention involving coke distillate. Comparable results may be obtained for other hydrophobic liquids.

Fifteen grams of the phenol extract of coke distillate were added to a vessel containing 3 liters of water and having a surface area of 225 $cm^2$. The blend was mixed for 0.5 hours forming a temporary emulsion with a final hydrocarbon concentration of approximately 5000 mg/l. Following this mixing, approximately 225 mg, (1.5% of the hydrocarbon mass) of expanded graphite having a density of 2 g/l and a volume of about 112 ml was dispersed on the surface of the contaminated water. The expanded graphite particles were derived from battery graphite using the procedure of Example II and were directly applied to the liquid surface with mechanical agitation.

Upon addition of the expanded graphite particles, cohesive floating agglomerates of coke distillate and expanded graphite particles were formed. Formation of these floating agglomerates occurred rapidly after the expanded graphite was allowed to combine with the floating liquid hydrocarbon. The floating agglomerates were then manually removed from the surface of the liquid after thirty seconds using a metallic screen as an adsorbent trap. During the course of the experiment the cellular dimensions of the adsorbent trap varied from 2 mm to 10 mm. Following the mechanical removal of the agglomerates residual concentrations of petroleum products in the treated water were determined. The expanded graphite and hydrocarbon agglomerates were then combusted, resulting in a burn off of the petroleum products. In addition to removing the adsorbed hydrocarbon, the combustion restored the binding capacity and initial density of the expanded graphite. The restored expanded graphite particles were then reused for water treatments in various ratios with the oil. Ten water treatment cycles using the same portion of expanded graphite particles were implemented. The results of these treatment cycles are presented in Table III.

TABLE III

| Treatment cycle | Consumption of graphite per 1 kg oil, % | Aqueous concentration of petroleum products, mg/l | | Cell size in sorbent trap, mm |
| --- | --- | --- | --- | --- |
| | | polluted water mg/l | clean water mg/l | |
| 1 | 0.1 | 5000 | 1 | 2 |
| 2 | 0.5 | 5000 | 3 | 4 |
| 3 | 1.5 | 5000 | 5 | 5 |
| 4 | 5 | 5000 | 5 | 8 |
| 5 | 10 | 5000 | 7 | 8 |
| 6 | 10 | 5000 | 8 | 10 |
| 7 | 10 | 5000 | 9 | 10 |
| 8 | 10 | 5000 | 10 | 10 |
| 9 | 10 | 5000 | 10 | 10 |
| 10 | 8 | 5000 | 12 | 11 |

Example III serves to further illustrate the highly beneficial characteristics of the present invention. Among the most significant advantages of the disclosed method is the ability to repeatedly use the same expanded graphite particles with almost no loss of activity. Conveniently the regeneration of the particles may be accomplished through the simple heating or combustion of the material in any suitable apparatus. Table III indicates that particles which had been loaded with hydrophobic material and regenerated ten times were as efficient in removing hydrocarbons from the water as unused particles. While the amount of hydrocarbon contamination was slightly higher on the tenth pass this was most likely due to the larger mesh size used to remove the agglomerates. This unexpected regeneration capability greatly reduces the amount of material necessary to remove a given amount of hydrophobic liquid with a corresponding reduction in cost.

Additionally, as the present invention only uses expanded graphite in amounts from 0.1% to 10% of the weight of the hydrophobic liquid the amount of material required is already relatively low. More preferably the amount of expanded carbon dispersed will be less than 5% of the weight of the hydrophobic liquid. For instance Example III obtained excellent results repeatedly using expanded graphite equivalent to 1.5% of the weight of the hydrophobic liquid. While slightly higher amounts may be necessary to obtain the same results under adverse conditions or when the bulk density of the expanded graphite is somewhat higher, the adsorptive capacity of the particles ensures that effective remediation may be accomplished using small amounts of material. This greatly simplifies the logistics and expenses involved in the removal of hydrophobic contaminants especially from relatively inaccessible areas.

Further adding to the appeal of the present invention is the ability to separate the valuable hydrophobic material prior the quick and efficient regeneration of the expanded carbon. The removal of the hydrophobic liquid may easily be accomplished through the application of physical force or chemical compounds. For instance the agglomerated material could be spun in an industrial centrifuge or mechanically pressed to separate the liquid hydrocarbon or adsorbed organic material. Similarly, the agglomerated material could be exposed to a surfactant or detergent causing the release of the hydrophobic liquid by altering the surface properties of the expanded graphite particles. Both chemical or physical separation processes will provide relatively high recovery of the hydrophobic liquid. Further, as the hydrophobic material is preferentially adsorbed, the portion recovered from the expanded graphite will be relatively free of contaminating polar material. This selective separation may be easily exploited for manufacturing processes or laboratory procedures. Additionally the recovery of the hydrophobic material will not interfere with the subsequent regeneration of the expanded carbon particles.

Example III also illustrates the rapid formation of cohesive floating agglomerates composed of expanded graphite particles and the hydrophobic material. For the purpose of this disclosure floating indicates that the agglomerates have a density less than the surrounding polar medium. For pure water this would translate to a density of less than one while in sea water it may be slightly higher. The agglomerates tend to form in a relatively short time following the contact of effective amounts of expanded graphite with the hydrophobic material. For instance the agglomerates were completely formed and of sufficient mechanical strength to remove after thirty seconds in Example III.

The speed of agglomerate formation is highly dependant on the contact rate between the expanded carbon particles and the hydrophobic liquid. In turn, this contact rate depends on such factors as the efficiency of particle dispersion, degree of agitation, concentration of hydrophobic liquid and physical parameters such as temperature and medium composition. In open bodies of water the natural action of wind and waves will increase the agitation and contact rate up to a point. Beyond this the rough water may tend to interfere with the attractive forces of the materials and break up forming agglomerates. Similarly the temperature of the water or the presence of salt may effect surface properties of the hydrophobic liquid or carbon particles and alter the agglomerate formation time.

In addition to formation time, the same parameters can also effect agglomerate size and cohesiveness. For the purposes this invention any agglomerates strong enough to be mechanically collected and separated from the surrounding liquid are suitable. In Example III the agglomerates attained an average size of 8 mm and were cohesive enough to collect using a mesh adsorbent trap. The increase in the mesh size of the adsorbent trap did little to reduce the effectiveness of the treatment and facilitated the collection of the agglomerates. The collection of the agglomerates from the surface of the polar liquid is preferably accomplished when the surrounding medium is allowed to drain away before the agglomerates are stored. Accordingly the preferred collecting means are porous such as screens, nets and the like. While mesh sizes less than 12 mm are preferred, the actual equipment used will depend on agglomerate dimensions and absolute volume.

While the present invention has been depicted, described, and is defined by reference to a particular exemplary embodiment of the invention, such reference does not imply a limitation on the invention, and no such limitation is to be inferred. The invention is capable of considerable modification, alteration, and equivalents in form and function, as will occur to those ordinarily skilled in the pertinent arts. The depicted and described embodiment of the invention is exemplary only, and is not exhaustive of the scope of the invention. Consequently, the invention is intended to be limited only by the spirit and scope of the appended claims, giving full cognizance to equivalents in all respects.

What is claimed is:

1. A process for removing a hydrophobic liquid from a liquid contaminated therewith, comprising:

contacting a liquid contaminated with a hydrophobic liquid with a plurality of expanded graphite particles having a bulk density of from about 0.2 g/l to about 2 g/l;

forming one or more agglomerates resulting from adsorption of said hydrophobic liquid by said plurality of expanded graphite particles; and removing said agglomerates from the contaminated liquid.

2. The process of claim 1 which further comprises separating said hydrophobic liquid from said agglomerates.

3. The process of claim 2 wherein said hydrophobic liquid is combustible and is separated from said agglomerates by burning.

4. The process of claim 2 wherein said hydrophobic liquid is separated from said agglomerate by applying a compressive force to said agglomerates.

5. The process of claim 3 wherein the expanded graphite particles remaining following the burning step have the capacity of adsorbing a hydrophobic liquid.

6. The process of claim 2 wherein said hydrophobic liquid is separated from said agglomerate by contacting said agglomerates with a surfactant.

7. The process of claim 1 wherein said plurality of expanded graphite particles is applied in an amount ranging from about 0.05 wt % to about 20 wt % of said hydrophobic liquid.

8. The process of claim 7 wherein said plurality of expanded graphite particles is applied in an amount ranging from about 0.1 wt % to about 10 wt % of said hydrophobic liquid.

9. The process of claim 1 wherein the expanded graphite particles are manufactured from graphite selected from the group consisting of crucible graphite, pencil graphite, battery graphite, cast graphite, and scrap graphite.

10. The process of claim 1 wherein the expanded graphite particles are oxidized graphite particles.

11. The process of claim 1 wherein said hydrophobic liquid comprises a hydrocarbon.

12. The process of claim 11 wherein said hydrocarbon is selected from the group consisting of black oil, machine oil, crude oil, coke distillate, naphtha, kerosene, toluene and gasoline.

13. The process of claim 1 wherein said liquid contaminated with said hydrophobic liquid is a body of water.

14. A process for removing a hydrophobic liquid from a contaminated water surface comprising:

contacting a water surface contaminated with a hydrophobic liquid with a plurality of dispersed expanded graphite particles having a bulk density of from about 0.2 g/l to about 2 g/l wherein the total mass of said particles ranges from about 0.1 wt % to about 10 wt % of said hydrophobic liquid;

allowing said particles to remain in contact with said hydrophobic liquid whereby one or more agglomerates of expanded graphite particles having said hydrophobic liquid adsorbed thereon are produced;

recovering said agglomerates from said water surface using a mesh apparatus having a cell size of less than 144 $mm^2$; and removing said hydrophobic liquid from said agglomerates through the application of mechanical force to said agglomerate.

15. The process of claim 14 which additionally includes the step of combusting the expanded graphite particles remaining after removing said hydrophobic liquid from said agglomerates to provide expanded graphite particles having the capacity of adsorbing a hydrophobic liquid.

* * * * *